(12) United States Patent
Huang et al.

(10) Patent No.: US 12,031,914 B2
(45) Date of Patent: Jul. 9, 2024

(54) METHODS FOR IMAGING TRANSPARENT TWO-DIMENSIONAL SHEETS BY FLUORESCENCE QUENCHING MICROSCOPY

(71) Applicant: Northwestern University, Evanston, IL (US)

(72) Inventors: Jiaxing Huang, Wilmette, IL (US); SonBinh T. Nguyen, Evanston, IL (US); Zhizhi Kong, Berkeley, CA (US)

(73) Assignee: Northwestern University, Evanston, IL (US)

( * ) Notice: Subject to any disclaimer, the term of this patent is extended or adjusted under 35 U.S.C. 154(b) by 379 days.

(21) Appl. No.: 17/630,417

(22) PCT Filed: Sep. 18, 2020

(86) PCT No.: PCT/US2020/051407
§ 371 (c)(1),
(2) Date: Jan. 26, 2022

(87) PCT Pub. No.: WO2021/055688
PCT Pub. Date: Mar. 25, 2021

(65) Prior Publication Data
US 2022/0283089 A1 Sep. 8, 2022

Related U.S. Application Data

(60) Provisional application No. 62/902,673, filed on Sep. 19, 2019.

(51) Int. Cl.
*G01N 21/64* (2006.01)
*G01N 21/17* (2006.01)
*G01N 21/84* (2006.01)

(52) U.S. Cl.
CPC ......... *G01N 21/6458* (2013.01); *G01N 21/17* (2013.01); *G01N 21/6428* (2013.01);
(Continued)

(58) Field of Classification Search
CPC ............... G01N 21/6458; G01N 21/17; G01N 21/6428; G01N 21/8422; G01N 2021/6432; G01N 2021/8427
See application file for complete search history.

(56) References Cited

U.S. PATENT DOCUMENTS 8,426,120 B2  4/2013  Huang et al.
9,464,990 B2  10/2016 Kyle et al.
(Continued)

FOREIGN PATENT DOCUMENTS

CN    104568876 B    3/2017

OTHER PUBLICATIONS

Alvin T. L. Tan et al., Seeing Two-Dimensional Sheets on Arbitrary Substrates by Fluorescence Quenching Microscopy, Small 2013, vol. 9, No. 19; pp. 3253-3258.
(Continued)

*Primary Examiner* — Tarifur R Chowdhury
*Assistant Examiner* — Akbar H. Rizvi
(74) *Attorney, Agent, or Firm* — Bell & Manning, LLC

(57) ABSTRACT

Methods of imaging a 2D sheet are provided. In embodiments, such a method comprises illuminating a sample with light having a wavelength 1, the sample comprising a quenching substrate; a transparent, non-quenching 2D sheet on the quenching substrate; and a fluorescent layer comprising fluorescent dye molecules on the transparent, non-quenching 2D sheet and the quenching substrate, providing background domains and 2D sheet domains in the sample, wherein the light induces fluorescence of the dye molecules in the fluorescent layer. The method further comprises
(Continued)

detecting fluorescence from the sample to provide an image of the transparent, non-quenching 2D sheet, wherein an intensity $I_B$ of the detected fluorescence from the background domains is less than an intensity $I_{2DS}$ of the detected fluorescence from the 2D sheet domains, thereby providing contrast in the image.

17 Claims, 11 Drawing Sheets

(52) U.S. Cl.
CPC . *G01N 21/8422* (2013.01); *G01N 2021/6432* (2013.01); *G01N 2021/8427* (2013.01)

(56) References Cited

U.S. PATENT DOCUMENTS

2014/0121132 A1  5/2014  Cerf et al.
2019/0219519 A1*  7/2019  Li .......................... G01N 21/45

OTHER PUBLICATIONS

The International Search Report and the Written Opinion issued on Dec. 8, 2020 for international patent application No. PCT/US2020/051407; pp. 1-7.

* cited by examiner

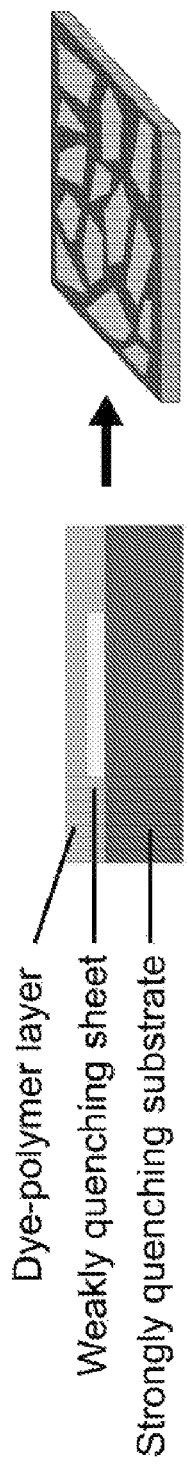
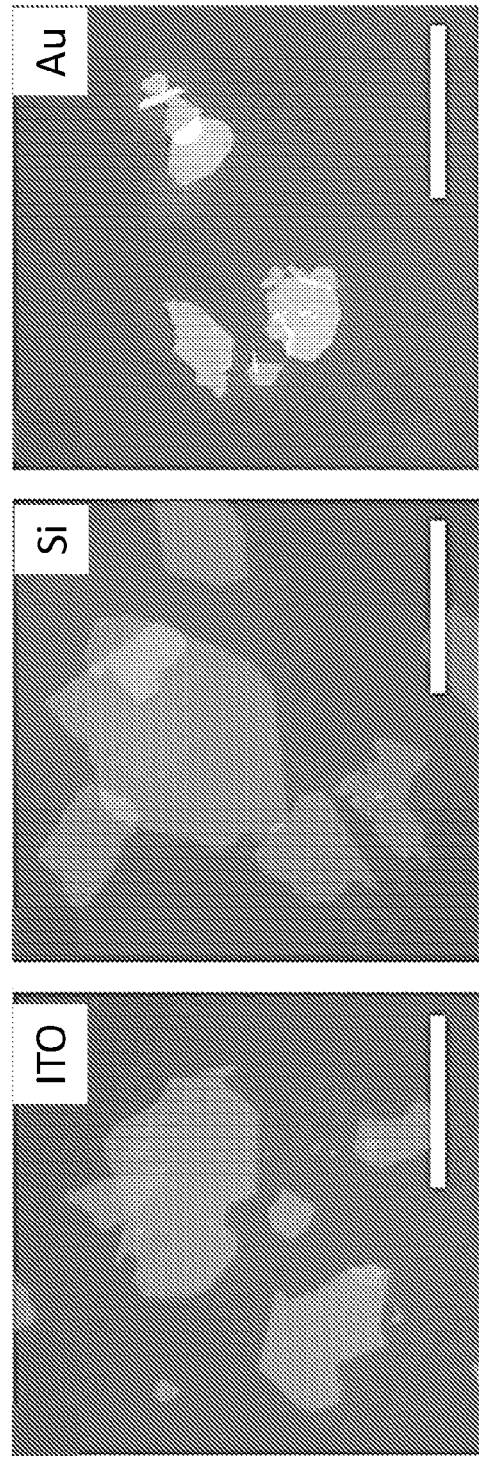
FIG. 2A
FIG. 2B  FIG. 2C  FIG. 2D

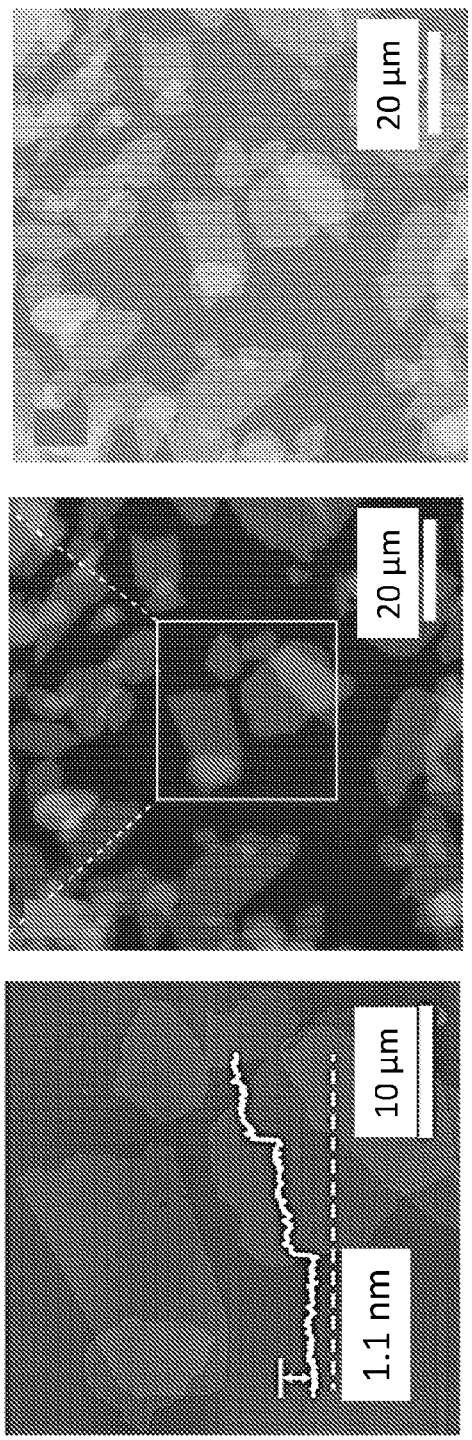

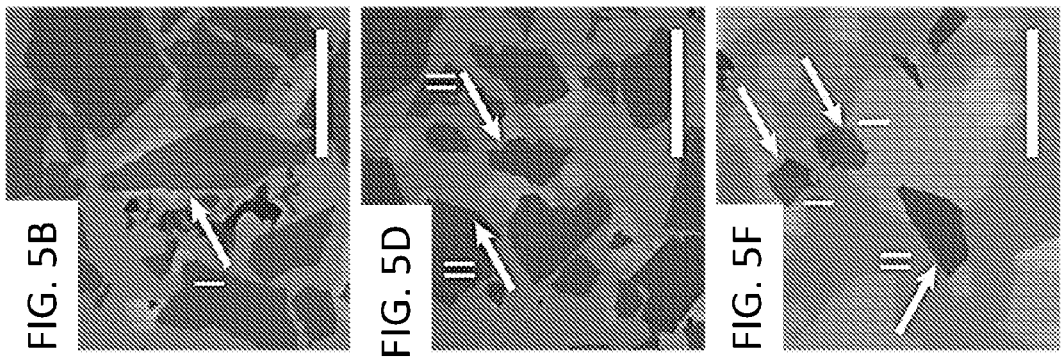
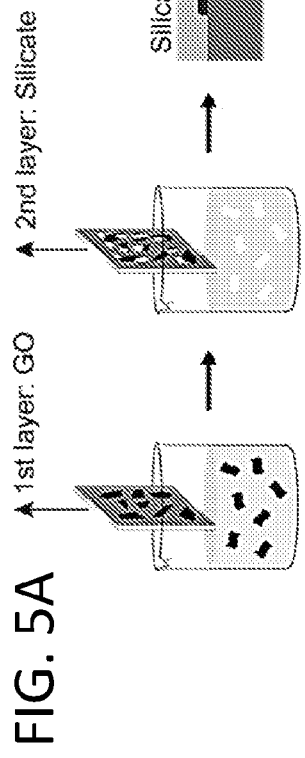

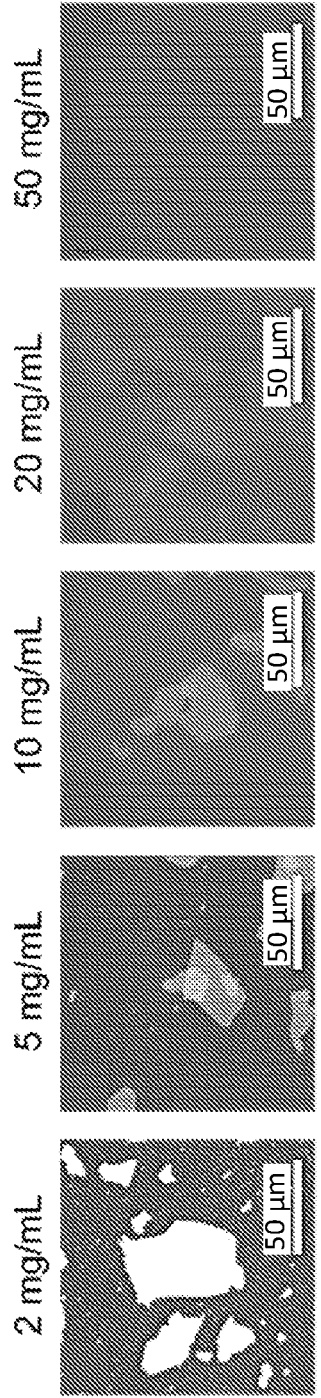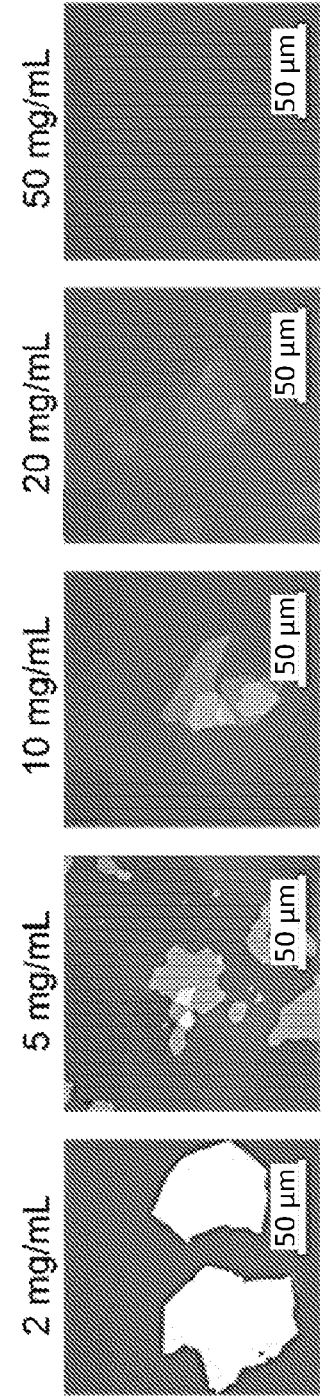

METHODS FOR IMAGING TRANSPARENT TWO-DIMENSIONAL SHEETS BY FLUORESCENCE QUENCHING MICROSCOPY

CROSS-REFERENCE TO RELATED APPLICATIONS

This application is a National Stage of International Application No. PCT/US2020/051407, filed Sep. 18, 2020, which claims priority to U.S. provisional patent application number 62/902,673 that was filed Sep. 19, 2019, the entire contents of both of which are incorporated herein by reference.

BACKGROUND

Solution-processable two-dimensional (2D) sheets with high aspect ratios and uniform thickness are highly desirable for realizing scalable engineering applications of 2D materials. Among these large 2D sheets, delaminated clay and metal oxide sheets are promising candidates for making high-performance membranes and barrier coatings due to their high thermal and chemical stabilities, tunable in-plane chemical compositions, and the associated electronic, mechanical, and catalytic properties. For example, (synthetic) hectorite is an inexpensive, abundant clay mineral that shows excellent surface reactivity, high cation-exchange capacity, and outstanding adsorption properties; and delaminated sheets of this material can be used in adsorbents, catalysts, and barrier materials. For metal-oxide-based 2D materials, a notable example is negatively charged titania 2D sheets that have been used as photocatalysts, electrodes, and dielectric layers in electronic devices. Visualizing these 2D sheets during their processing is an important characterization capability in their synthesis, manufacturing, and processing, as it helps to inspect the sample quality in terms of lateral size distribution of the sheets, uniformity in their thickness, their coverage on a surface, and other features such as overlaps, wrinkles, and folds.

Atomic force microscopy (AFM) and scanning electron microscopy (SEM) are two most often used techniques for imaging 2D materials. AFM is particularly suitable for measuring the thickness of 2D sheets, but it is rather time-consuming and typically can only image 2D sheets deposited on atomically smooth surfaces such as polished silicon wafers. AFM imaging of 2D materials on common glass slides has been found challenging. SEM offers quicker, larger-scale overview of the lateral size distribution of the flakes, but it requires conductive substrates and operates under a vacuum environment. Optical microscopy offers much higher throughput for imaging 2D materials, and is more convenient to use. Although its lateral resolution is diffraction-limited, optical microscopy is most useful for quick evaluation of relatively large, micron-sized 2D sheets, which is also most relevant to current synthetic efforts. Optical imaging of single-layer graphene was first achieved for samples deposited on Si wafers with a dielectric layer (e.g., $SiO_2$ or $Si_3N_4$) of several hundred nanometers based on interference, and was later extended to many other 2D materials. Nevertheless, the thickness of the dielectric layer and wavelength of the incident light must be carefully optimized to provide discernable optical contrast for direct visual observation.

SUMMARY

Provided herein are methods for imaging certain two-dimensional (2D) sheets. The methods are based on fluorescence quenching microscopy (FQM).

Methods of imaging a 2D sheet are provided. In embodiments, such a method comprises illuminating a sample with light having a wavelength $\lambda$, the sample comprising a quenching substrate; a transparent, non-quenching 2D sheet on the quenching substrate; and a fluorescent layer comprising fluorescent dye molecules on the transparent, non-quenching 2D sheet and the quenching substrate, providing background domains and 2D sheet domains in the sample, wherein the light induces fluorescence of the dye molecules in the fluorescent layer. The method further comprises detecting fluorescence from the sample to provide an image of the transparent, non-quenching 2D sheet, wherein an intensity $I_B$ of the detected fluorescence from the background domains is less than an intensity hos of the detected fluorescence from the 2D sheet domains, thereby providing contrast in the image.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

FIG. 1A shows a schematic that illustrates how strongly quenching 2D sheets appear under FQM. Left: Here, the sheets are deposited on a substrate, on top of which a dye-polymer layer is spin-coated. Right: Upon excitation, the sheets appear dark against a bright background. FIG. 1B shows an FQM image showing the boundary between areas of GO (right) and silicate clay (left) sheets. Here, the high-contrast GO sheets act as a marker to help locate and image the weakly quenching silicate sheets. FIG. 1C shows that the silicate clay sheets deposited on top of GO are much more visible than those deposited on glass (white dashed line, area I).

FIGS. 2A-2D. FIG. 2A is a schematic that illustrates how FQM can be used to image weakly quenching 2D materials. When deposited on a strongly quenching substrate, these dielectric sheets can act as a spacer to reduce the degree of fluorescence quenching by the substrate, thus appearing as bright sheets in a dark background. FIGS. 2B-2D show FQM images of silicate sheets on doped silicon wafer, ITO-and Au-coated glass substrates. Scale bars=50 µm.

FIGS. 3A-3C. The same area of a silicate clay sample imaged by (FIG. 3A) AFM, (FIG. 3B) FQM, and (FIG. 3C) SEM. FQM can image these sheets with high contrast and layer resolution comparable to AFM and SEM. The line scan in AFM shows that the clay sheets are made of single layers.

FIGS. 4D-4F are FQM images showing a large-area overview of the corresponding samples. Scale bars=200 µm.

FIGS. 5A-5F. FQM can resolve stacking sequence in vertical heterojunctions made of different 2D materials. (FIG. 5A) Silicate sheets deposited on GO can be made by a sequential dip-coating process. (FIG. 5B) In the corresponding FQM image, the overlapped area (i.e., silicate on GO, named type-I stack) appears brighter than the GO area since the clay sheet acts as a spacer to reduce the degree of fluorescence quenching by the underlying GO. (FIG. 5C) Type-II stack made of GO on silicate can also be obtained by the sequential dip-coating process in reversed order. (FIG. 5D) In the corresponding FQM image, the overlapped area (i.e., GO on silicate) appears as dark as the GO. (FIG.

5E) When GO and silicate sheets are co-deposited together, both type-I and type-II stacks are generated, which can be differentiated by (FIG. 5F) FQM. Scale bars=50 µm.

Figure 6A:
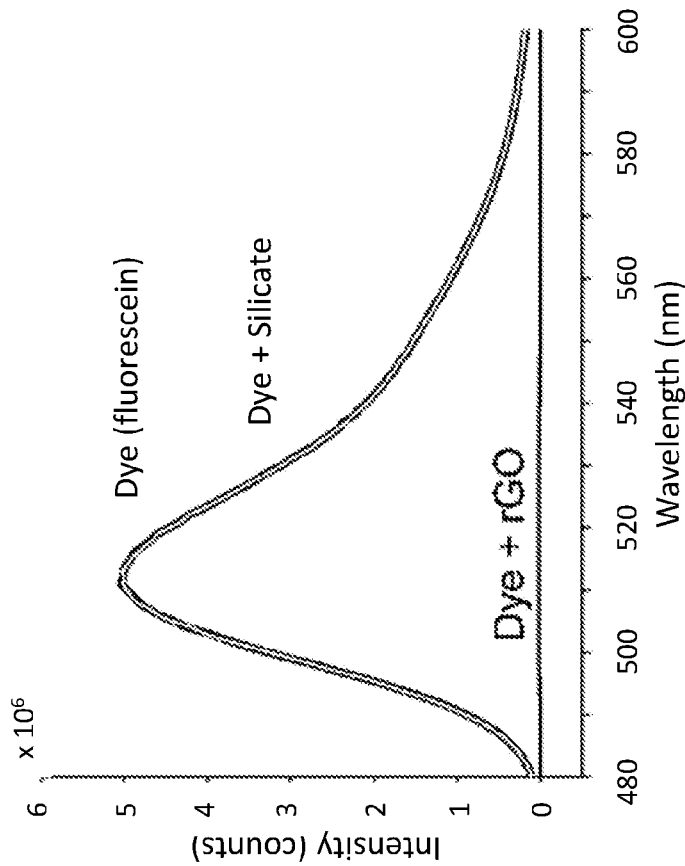
Figure 6B:
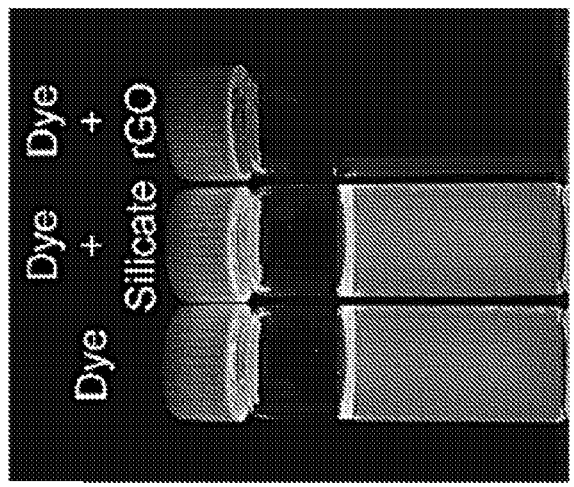

FIGS. 6A-6B. Fluorescence spectra (FIG. 6A) and photograph (FIG. 6B) of aqueous solutions of the fluorescein dye, the [dye +silicate nanosheets] mixture, and the [dye+ rGO nanosheets] mixture, showing no significant quenching of the dye emission by the silicate nanosheets but strong quenching by GO. Fluorescein ($\lambda_{em}$=512 nm) was used in this experiment as a model for the PM546 dye ($\lambda_{em}$=546 nm) given its better solubility in water, the solvent of choice for the silicate nanosheets.

Figure 7:
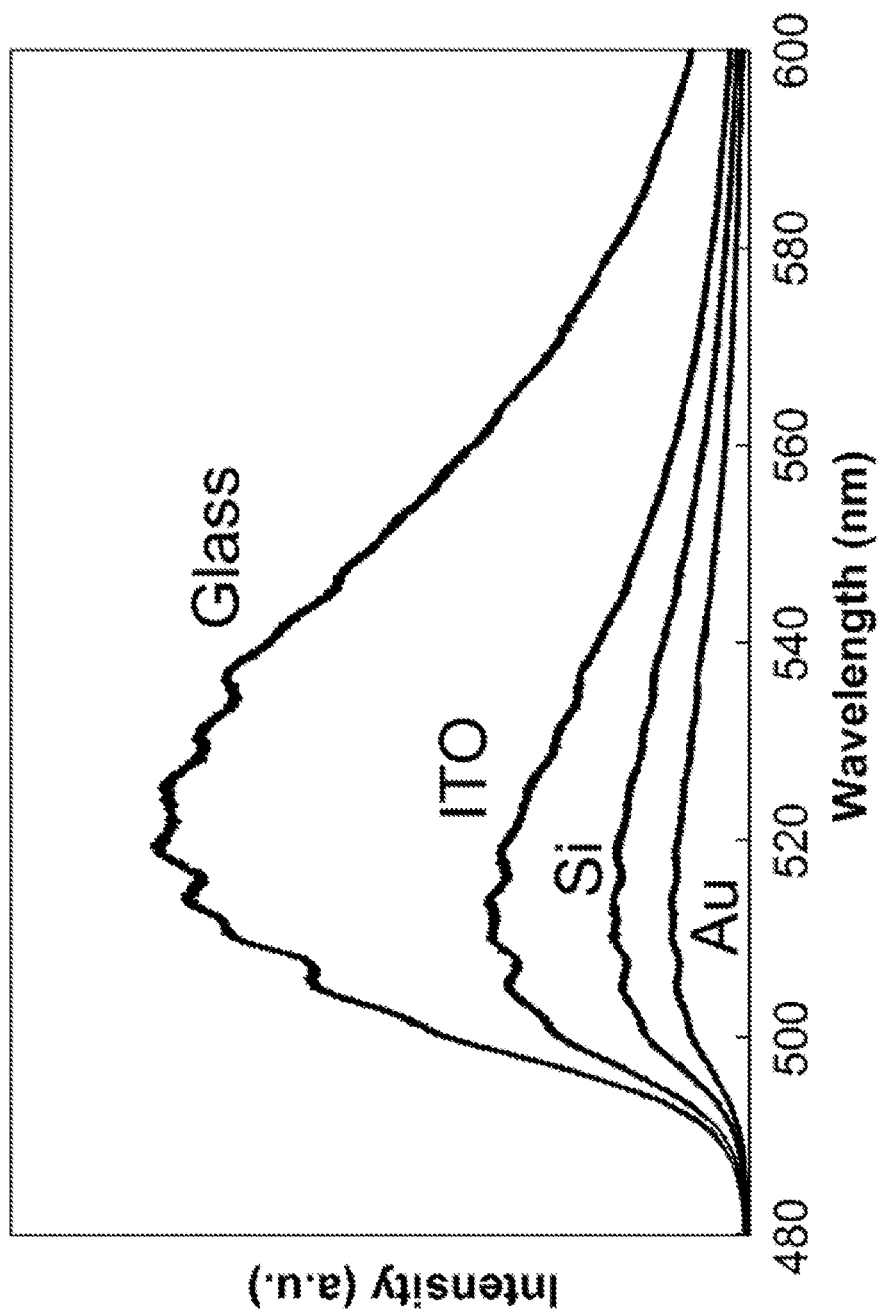

FIG. 7. Photoluminescence spectra of dye-polymer layer on different substrates. The differences in spectrum intensities of the ITO, Si, Au on glass, and bare (uncoated) glass indicates that those substrates have different quenching abilities. The lower intensity indicates the stronger quenching ability of the substrate.

Figure 8C:
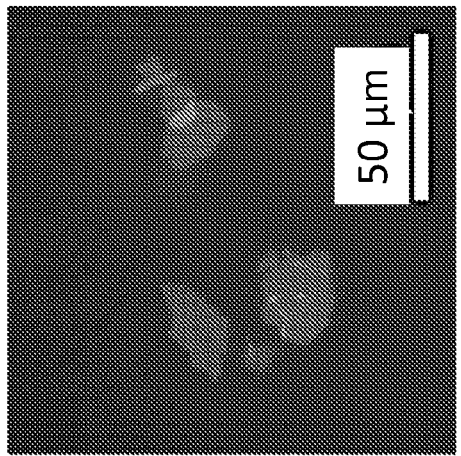
Figure 8B:
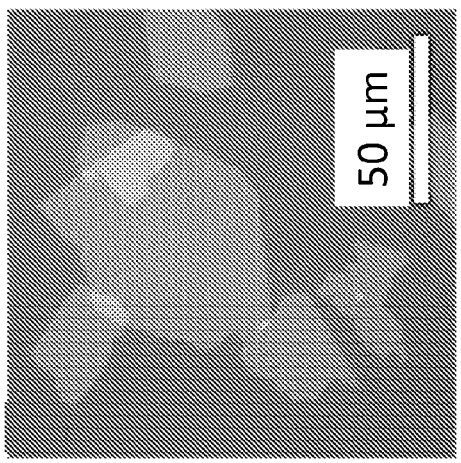
Figure 8A:
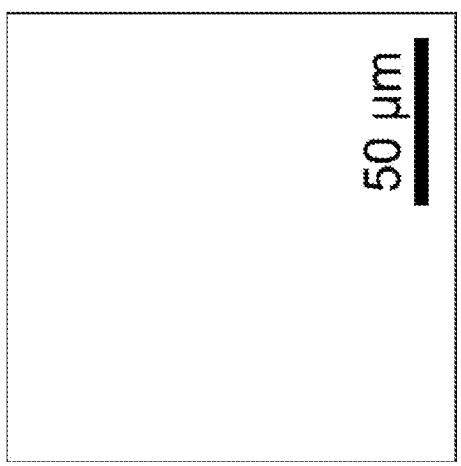

FIGS. 8A-8C. FQM images of the silicate nanosheets on ITO (FIG. 8A), Si (FIG. 8B), and Au on glass (FIG. 8C) with a 3 s exposure time. There are significant variations in the background intensities, and thus the contrast against the silicate-deposited regions, due to the different quenching abilities of substrates. The FQM image of the ITO sample (FIG. 8A) was over-exposed due to the less-effective quenching ability of the ITO substrate. In this sense, reducing the exposure time would result in a better contrast. The exposure times for each substrate were tuned to provide the best contrast as in FIGS. 2A-2C.

FIGS. 9A-9J. FQM images of silicate nanosheets deposited on ITO (FIGS. 9A-9E) and Si (FIGS. 9F-9J) substrates with different thicknesses of the dye-polymer overlayer. To allow for fair comparison of the contrasts, the background intensity of each image was kept the same by changing the exposure time. As the thickness of the dye-polymer overlayer increased (FIGS. 9A-9E) (FIGS. 9F-9J), less exposure time is needed and the image contrast decreased; however, single and multilayer domains were still distinguishable (FIGS. 9A-9D) (FIGS. 9F-9I). For FIG. 9E and FIG. 9J, the contrast was too low to visualize the silicate nanosheets since the fluorescence intensities of both the substrate and sample regions were similarly strong when the dye-polymer layer was thick. The "spacing" effect was most apparent when the dye-polymer overlayer was the thinnest because the quenching was strongest near the substrate surface and thus the difference in intensities between the sample and background regions was largest. However, the dye-polymer overlayer might become less uniform if the polymer concentration is too low. The optimal thickness of the dye-polymer overlayer was empirically found to be around 5 to 20 nm.

Figure 10C:
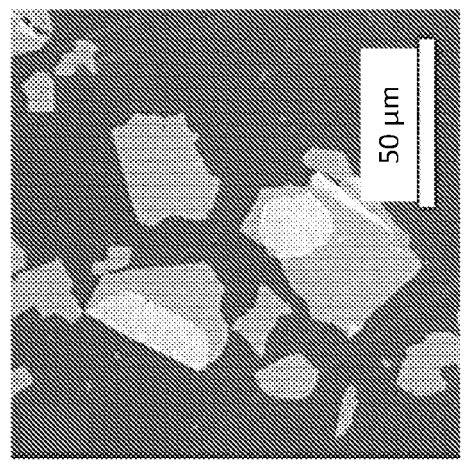
Figure 10B:
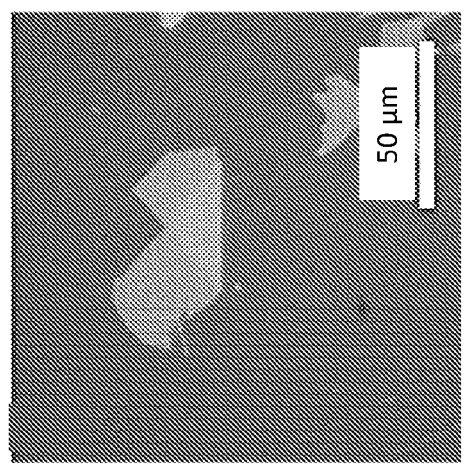
Figure 10A:
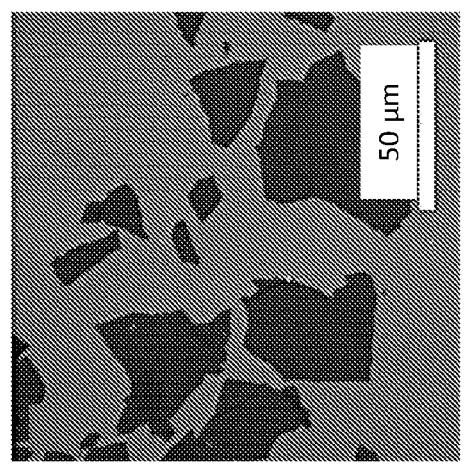
Figure 11A:
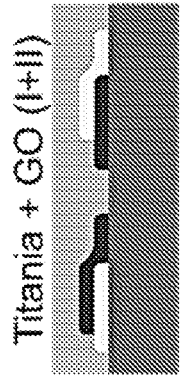
Figure 11B:
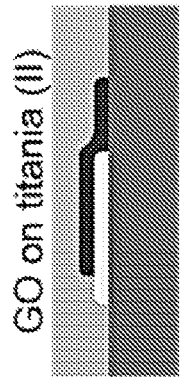
Figure 11C:
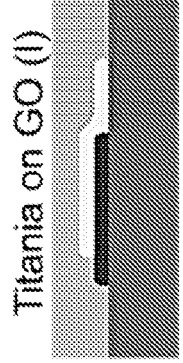
Figure 11D:
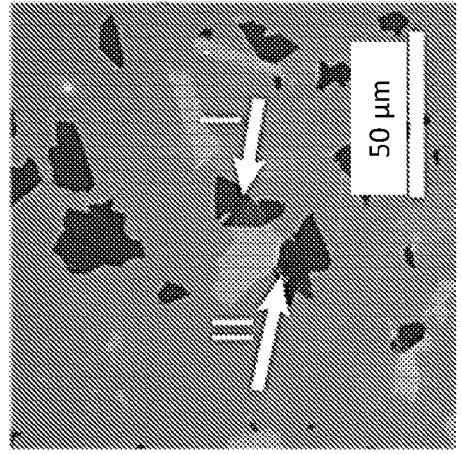
Figure 11E:
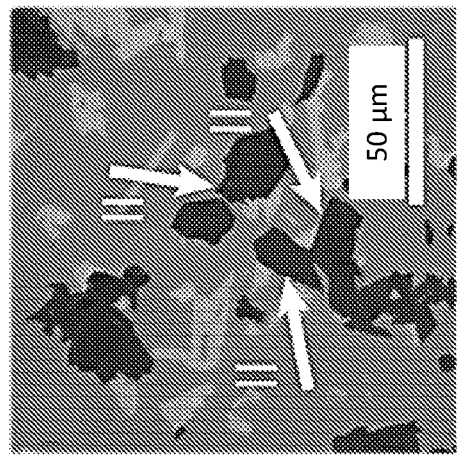
Figure 11F:
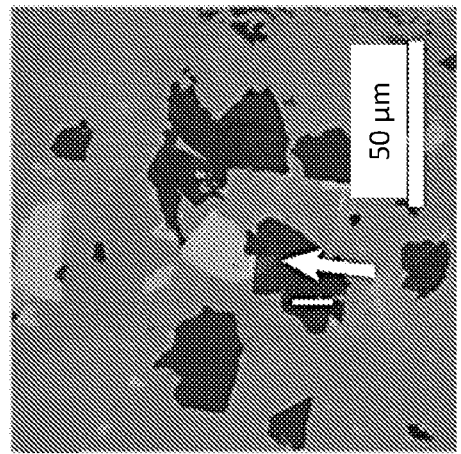

FIGS. 10A-10C. FQM images of GO (FIG. 10A), titania (FIG. 10B), and silicate nanosheets (FIG. 10C, as a reference), on ITO substrate with same exposure time (1 s). GO and titania were deposited by LB while silicate nanosheets were deposited by dip-coating. All samples were coated with a~5 nm PM546-PMMA film. The exposure times for each 2D material were tuned to provide the best contrast in the manuscript as FIGS. 4A-4C.

FIGS. 11A-11F. FQM images of titania-on-GO (FIG. 11A, FIG. 11D) and GO-on-titania (FIG. 11B, FIG. 11E) and GO-titania (FIG. 11C, FIG. 11F) heterostructures. The [silicate+GO] heterostructure data in this figure was also shown in the manuscript as FIGS. 5A-5F.

DETAILED DESCRIPTION

Provided herein are methods for imaging certain two-dimensional (2D) sheets. The methods are based on fluorescence quenching microscopy (FQM). FQM has been previously used to image other 2D sheets such as graphene, graphene oxide, and certain metal dichalcogenide sheets. Those methods were based on the ability of those 2D sheets to strongly quench fluorescence emitted from nearby dye molecules. In images collected from those methods, the 2D sheets appear as dark sheets against bright backgrounds. By contrast, the present methods use a modified FQM technique to image 2D sheets that exhibit no ability (or limited ability) to quench the same fluorescence emitted from nearby dye molecules. The modification is based, at least in part, on a serendipitous observation (described in the Example, below) and the inventors' subsequent realization of the role the that the substrate plays. As a result, the modified FQM technique is extended to image a much broader variety of 2D materials than was previously understood.

In embodiments, a method of imaging a 2D sheet comprises illuminating a sample with light having a wavelength λ, the sample comprising a quenching substrate; a transparent, non-quenching 2D sheet on (e.g., in direct contact with) the quenching substrate; and a fluorescent layer comprising fluorescent dye molecules on (e.g., in direct contact with) the 2D sheet and the quenching substrate to provide background domains and 2D sheet domains. The light induces fluorescence of the dye molecules in the fluorescent layer. The method further comprises detecting fluorescence transmitted through the sample, wherein an intensity of the detected fluorescence through the background domains $I_B$ is less than an intensity of the detected fluorescence through the 2D sheet domains $I_{2DS}$. In other words, by contrast to existing FQM methods, in the present methods, the 2D sheets appear as bright sheets against dark backgrounds. The detected fluorescence can provide an image of the sample/2D sheet and the difference in intensities ($I_{2DS}-I_B$) provides contrast in the image. The contrast may be given by $C=(I_{2DS}-I_B)/I_{2DS}$. The contrast is tunable and may be greater than 50%, greater than 75%, greater than 95%, or 100%.

The 2D sheets to be imaged in the present methods are both transparent and non-quenching. By "transparent" it is meant that the optical absorbance of a monolayer of the material from which the 2D sheet is composed is no greater than 5% over the visible range of the electromagnetic spectrum (e.g., from 400 nm to 700 nm). This includes no greater than 3% or no greater than 1%. By "non-quenching," it is meant that the 2D sheet does not reduce the intensity of the fluorescence of the selected dye molecules being used in the method. However, "non-quenching" also encompasses small intensity reductions, in which case the 2D sheet may be referred to as "weakly quenching." The phrases "non-quenching" and "weakly quenching" may be used interchangeably. The quenching ability may be quantified from fluorescence spectra comparing the peak intensity of the selected dye molecule alone (or a reference dye molecule) to the peak intensity of a mixture of the selected dye molecule (or reference dye molecule) with the selected 2D sheet. The conditions under which such fluorescence spectra may be obtained are described in the Example below; see also FIGS. 6A-6B. When mixed with the selected dye molecule (or reference dye molecule), non-quenching/weakly quenching 2D sheets exhibit peak fluorescence intensities which are within 10% of, 5% of, or the same as the peak fluorescence intensity of the selected dye molecule (or reference dye molecule), i.e., the selected dye molecule/reference dye molecule alone.

By virtue of their two-dimensional nature, the 2D sheets are very thin, e.g., less than 25 nm, less than 10 nm, less than 5 nm, or having a thickness of a monolayer of the material from which the 2D sheet is composed. However, the lateral dimensions of the 2D sheets are much greater, e.g., microns.

Illustrative materials from which the 2D sheets may be composed include boron nitride, types of clays, and types of metal oxides. An illustrative clay is a sodium fluorohectorite such as $Na_{0.5}Mg_{2.5}Li_{0.5}Si_4O_{10}F_2$. An illustrative metal oxide is a lepidocrocite-type titanate.

The sample may (and typically does) comprise multiple 2D sheets. The transparent, 2D sheets may be all of the same type or may be of different types (e.g., composed of different materials). The different types of 2D sheets may have different quenching abilities. The different types of 2D sheets will generally be discernable in the images based on their different contrasts in the image. As further described in the Example, below, for 2D sheets of the same type, different areas of contrast in the collected image provides information about the thickness of the 2D sheet, its morphology (e.g., folding, crumpling, etc.) as well as stacking of individual 2D sheets (e.g., see FIGS. 2B-2D).

A variety of types of quenching substrates and dye molecules may be used to form the samples which enable imaging of the 2D sheets. The particular combination of quenching substrate and dye molecule depends upon the 2D sheet to be imaged as well as the general desire to maximize contrast in the image. By contrast to the 2D sheet, the substrate is "quenching," by which it is meant that the substrate does reduce the intensity of the fluorescence of the selected dye molecule being used in the method. The quenching ability may be quantified from photoluminescence spectra comparing the peak intensity of a layer comprising the selected dye molecule (or reference dye molecule) on a reference substrate (e.g., bare, uncoated glass) to the peak intensity of the same layer on the quenching substrate. The conditions under which such photoluminescence spectra may be obtained are described in the Example below; see also FIG. 7. The quenching substrates exhibit peak intensities which are no more than 50%, no more than 40%, no more than 30%, no more than 25%, or no more than 10% that of the peak intensity of glass. The phrases "strongly quenching" and "quenching" may be used interchangeably. The quenching substrates may be composed of conductive materials. Illustrative conductive materials include doped silicon (e.g., n-type silicon), metals (e.g., gold), metal-coated glass, or indium tin oxide (ITO)-coated glass.

As noted above, a variety of types of dye molecules in the fluorescent layer may be used, and they may be selected in conjunction with the quenching substrate so as to match the quenching abilities described above for the substrate. Otherwise, the type of dye molecules is not particularly limited. Illustrative fluorescent dye molecules include fluorescein, 4-(dicyanomethylene)-2-methyl-6-(4-dimethylaminostyryl)-4H-pyran, 2,5-bis(5-tert-butyl-2-benzoxazolyl)thiophene, and pyrromethene.

The fluorescent layer comprising the dye molecules may further comprise a polymer to provide a matrix to retain the dye. The type of polymer is not particularly limited. Illustrative polymers include polyvinylpyrrolidone (PPV) and poly(methyl methacrylate) (PMMA). The thickness of the fluorescent layer may be adjusted to provide a desired contrast (e.g., maximum). Illustrative suitable thickness ranges include in a range of from 1 nm to 30 nm, from 2 nm to 25 nm, and from 5 nm to 20 nm.

The samples to be imaged may be formed using known thin film deposition techniques. Illustrative techniques and conditions are described in the Examples, below.

In addition to transparent, non-quenching 2D sheets, the sample may also comprise transparent 2D sheets that do exhibit the ability to quench the fluorescence emitted from the selected dye molecules. By way of illustration, the sample may comprise graphene sheets (or a graphene-based sheet), which as noted above, are capable of strongly quenching fluorescence. However, the selected quenching substrate may have a quenching ability that is less than that of the graphene sheets. In that case, graphene sheets will appear in the collected images via a contrast mechanism opposite that of the transparent, non-quenching 2D sheets. That is, the graphene sheets will appear dark on a brighter background (e.g., see FIG. 10A).

The light used in the present methods has a wavelength (or wavelength range) sufficient to induce fluorescence of the selected dye molecule. That is, the wavelength is selected to overlap with the absorption spectrum (or the absorption peak) of the selected dye molecule. The sample may be illuminated with light for an exposure time which may be adjusted to provide a desired contrast (e.g., maximum). Exposure times may be in the range of seconds, e.g., a few seconds.

The present methods may be carried out on commercially available fluorescence microscope systems. Such systems may include various types of detectors configured to detect the fluorescence and acquire images, e.g., CCD cameras.

The ability of the present methods to discern different types of transparent 2D sheets based on their different quenching abilities also means that the methods may be used to provide information about the vertical architecture of samples comprising such different types of transparent 2D sheets. The phrase "vertical architecture" can refer to the stacking order or sequence of individual 2D sheets. This variation is illustrated in FIGS. 5A-5F and is further described in the Example, below. In embodiments, the sample being imaged comprises at least two types of transparent 2D sheets having different quenching abilities but unknown vertical architecture, and the collected image is compared with a reference or calibration image comprising the at least two types of transparent 2D sheets but having a known vertical architecture.

It is to be understood that the present disclosure encompasses the samples themselves, as described above.

EXAMPLE

Introduction

In this Example, delaminated silicate clay and titania sheets are used as model systems to show that non-quenching (including weakly quenching) transparent 2D sheets can be readily imaged by FQM based on a new mechanism, where they appear as bright sheets against a dark background. This is by direct contrast to FQM of 2D sheets such as graphene which appear as dark sheets against a bright background. In the new mechanism, when the transparent 2D sheets are deposited on quenching (including strongly quenching) substrates, they act as a "spacer" to reduce the degree of quenching of the dye layer by the substrate, making them highly visible. A broad range of conductive substrates are suitable, including doped silicon wafers and metals or indium tin oxide (ITO)-coated glass slides. This new FQM mechanism can be applied to visualize dielectric 2D materials with contrast and layer resolutions comparable to scanning electron microscopy (SEM) and atomic force microscopy (AFM). Moreover, when different 2D materials are co-deposited on a substrate, FQM not only differentiates them readily based on their quenching capabilities, but also can resolve the stacking sequence of their vertical heterojunctions based on the contrast of their overlapped areas.

Materials and Methods

Chemicals

Unless otherwise stated, all materials and reagents were used as received. Anisole, poly(methyl methacrylate) (PMMA) (average $M_w$=350000), fluorescein sodium salt, ammonium hydroxide, and the chemicals used for the graphene oxide synthesis (potassium persulfate, phosphorus pentoxide, potassium permanganate, concentrated sulfuric acid, hydrochloric acid) were purchased from Sigma-Aldrich Co., LLC. (St. Louis, Mo., USA). Hydrogen peroxide (30 wt %) was purchased from Fisher Chemical (Fair Lawn, N.J., USA). Pyrromethene 546 (PM546) was purchased from Exciton Inc (Dayton, Ohio, USA). The graphite for preparing GO was purchased from Asbury Carbons (Asbury, N.J., USA). The poly(tetrafluoroethylene) (PTFE) membrane (catalog #LSWP14250, 5.0 µm pore size) used for GO purification was purchased from Millipore (Merck KGaA, Darmstadt, Germany). The PTFE filter (catalog #6784-2504, 0.45 µm pore size) used for the purification of the dye-polymer solution was purchased from Whatman PLC. (GE Healthcare Life Science, Buckinghamshire, UK). Ultrapure deionized (DI) water (18.2 MΩ cm resistivity) was obtained from a Millipore Milli-Q Biocel A10 instrument (Millipore Inc., Billerica, Mass., USA).

The following powdered educts were used for the silicate synthesis: Sodium fluoride (purity 99.995%) and magnesium oxide (purity 99.95%) were purchased from Alfa Aesar (Kandel, Germany). Lithium fluoride (purity >99.9%) and magnesium fluoride (>99.9%) were purchased from Chem-PUR (Karlsruhe, Germany). Silicon dioxide (quartz fine granular) was purchased from Merck KGaA (Darmstadt, Germany).

The following chemicals were used for the preparation of titania: Lithium carbonate, potassium carbonate, titanium dioxide, and molybdenum trioxide of 99.9% purity or higher were purchased from Rare Metallic Co. Ltd. (Chiyoda-Ku, Japan) and used for the synthesis of a layered titanate of $K_{0.8}Ti_{1.73}Li_{0.27}O_4$. Concentrated aqueous HCl and dimethyl sulfoxide (DMSO) were purchased from Kishida Chemical Co. Ltd. (Osaka, Japan). Tetrabutylammonium hydroxide (10 wt % aqueous solution) was purchased from FUJIFILM Wako Pure Chemical Corp. (Osaka, Japan). Ultrapure deionized (DI) water (>18 MΩ cm resistivity) was obtained from Milli-Q Element and Milli-Q Integral 10 instruments (Merck KGaA, Darmstadt, Germany).

Substrates for the Imaging Studies

Gold-seal plain microscope slides were purchased from Thermo Scientific, Inc. (Portsmouth, N.H., USA). n-type silicon slices (batch #280624, resistivity $1\sim2\times10^{-2}$ Ω m) were purchased from Dynamit Nobel Silicon, S.p.A. (Novara, Italy). Indium tin oxide (ITO, UR-IT0007-1.5CM, 1.5 cm×1.5 cm, resistivity=$1.4\sim1.5\times10^{-6}$ Ω m as measured by a 2400 SourceMeter 4-point probe (Keithley Instruments LLC., Solon, Ohio, USA)) slides were purchased from Uni-Onward Co. (Taipei, Taiwan (Republic of China)). Gold for evaporation was purchased from Kurt J. Lesker Co. (Clairton, Penn., USA).

Instrumentation Used in the Preparation of Materials

In the preparation of GO: To purify the GO dispersion, a model 5810 centrifuge (Eppendorf, Inc., Westbury, N.Y., USA) equipped with a 6×85 mL high-speed fixed-angle rotor (F-34-6-38) was used. Ultrasonication was carried out using a Branson 8800 table-top ultrasonic bath (Branson Ultrasonics Corp., Danbury, Conn., USA).

In the Preparation of Silicate

Microprobe Analysis. The chemical composition of the clay was determined by wavelength-dispersive X-ray spectroscopy on crystals with flat-lying surfaces on a piece of carbon tape using an electron microprobe (JEOL JXA-8200, Bayerisches Geoinstitut, Bayreuth). The settings were 15 kV acceleration voltage, 15 nA initial beam current, a beam spot diameter of 10 µm, 10 s counting time at the peak position, and 5 s counting time at each side of the peak.

Inductive-coupled plasma atomic emission spectroscopy (ICP-OES). The lithium and magnesium contents of clay were determined by ICP-OES. Samples of about 20 mg of the dry clay were weighed into clean 15 mL Teflon flasks, followed by HCl (Merck, 1.5 mL of a 30 wt % aqueous solution), $H_3PO_4$ (Merck, 0.5 mL of a 85 wt % aqueous solution), $HNO_3$ (Merck, 0.5 mL of a 65 wt % aqueous solution), and $HBF_4$ (Merck, 1 mL of a 48 wt % aqueous solution). The mixture was then digested in an MLS 1200 Mega microwave digestion apparatus (MLS GmbH, Mikrowellen-Labor-Systeme, Leutkirch, Germany) for 6.5 min (heated at 600 W). The closed sample container was cooled to room temperature, and the clear solution was diluted to 100 mL in a volumetric flask and analyzed on a Vista-PRO radial spectrometer.

Powder X-ray Diffraction. Phase purity was confirmed by powder X-ray diffraction (PXRD) patterns of as-synthesized clays (data not shown), recorded on a STOE Stadi P powder diffractometer using Cu $K\alpha_1$ radiation.

In the preparation of titania nanosheets: A model CP100MX centrifuge (Koki Holdings Co. Ltd., Tokyo, Japan) was used to separate the swollen titanate crystals from the aqueous solution.

In the preparation of the thin-film samples for imaging: The Langmuir-Blodgett (LB) preparations of GO and Titania films was carried out using a NIMA technology (model #116, Espoo, Finland) LB trough equipped with a Wilhelmy-type balance for surface pressure measurement. To spin coat a dye/polymer layer or materials on substrates, a spin coater (model #WS-400BZ-6NPP/LITE, Laurell Technologies Co., North Wales, Penn., USA) was used. For the processing of material-coated substrates, an advanced hotplate stirrer (model #97042-606, VWR International LLC., Batavia, Ill., USA) was used.

Instrumentation Used in the Characterization of the Thin-Film Materials

Optical microscopy (OM) experiments were carried out using a Nikon Eclipse E600 POL upright microscope (Nikon Instruments Inc., Melville, N.Y., USA) equipped with a CCD camera (2048×1536 pixels, Teledyne QImaging, MicroPublisher 3.3 RTV, Surrey, BC, Canada) and 20×, 50× and 100× objectives.

Fluorescence quenching microscopy (FQM) experiments were carried out on a Nikon Eclipse TE2000-U inverted fluorescence microscope (Nikon Instruments Inc., Melville, N.Y., USA) equipped with a X-cite 120 PC illumination system (EXFO Photonic Solutions Inc. Mississauga, ON, Canada) as the light source. An ET-GFP filter cube (FITC/Cy2, Chroma Technology Co., Bellows Falls, Vt., USA) was used to select the appropriate excitation/emission wavelengths for each experiment. Images were taken using a monochrome interline CCD camera (CoolSNAP HQ2, 1392×1040 pixels, Teledyne Photometrics Co., Tucson, Ariz., USA).

Atomic force microscope (AFM) images were acquired with a Dimension FastScan AFM (Bruker, Calif., USA)

under tapping mode (air) using a Bruker silicon tip on nitride cantilever (model #FastScan-A, Bruker, Calif., USA). The parameters for the tips are lot-dependent: for wafer A028/05 produced on March 18, T=0.6 µm, L=27 µm, W=$f_0$=1400 kHz, k=18 N m$^{-1}$); for wafer A009/05 produced on April 13, T=530~630 nm, $f_0$=800~2000 kHz, k=10~25 N m$^{-1}$.

Scanning electron microscopy (SEM) images were taken using a Hitachi S4800-II cFEG microscope (Hitachi America, Ltd., Tarrytown, N.Y., USA) in secondary electron imaging mode at an acceleration voltage of 2 kV for silicate nanosheets on Si substrates.

Fluorescence emission spectra were obtained on a Jobin Yvon Fluorolog fluorometer (HORIBA Instruments Inc., Edison, N.J., USA) using the following parameters: $\lambda_{ex}$=450 nm, $\lambda_{em}$=480~650 nm, slit width=3 nm.

Photoluminescence measurements were carried out by a LabRam Confocal Raman spectrometer (HORIBA Instruments Inc., Piscataway Township, N.J., USA) equipped with a 473 nm Cobolt Blues solid-state laser (Cobolt AB, Solna, Sweden).

Synthesis of Graphene Oxide, Silicate Sheets, and Titania Sheets

Graphene oxide (GO). This material was synthesized by H.H. using a modified Hummers method with a two-step purification process. In a typical reaction, graphite powder (6 g), $K_2S_2O_8$ (5 g), $P_2O_5$ (5 g), and conc. $H_2SO_4$ (25 mL) were stirred together at 80±5° C. for 3.5 h. Next, the dispersion was diluted to 1 L with DI water, filtered over a PTFE membrane, further rinsed with DI water (2.5 L) to remove residual reactants, and then dried in air overnight. The pre-oxidized graphite powders were re-dispersed in conc. $H_2SO_4$ (230 mL) and chilled to 0° C. using an ice bath. $KMnO_4$ (30 g) was then slowly added to this mixture while stirring, making sure that the temperature of mixture remained below 10° C.

The resulting mixture was then transferred to a water bath at 35±5° C. and stirred for 2 h before being slowly diluted with DI water (0.5 L). To this stirring mixture was added $H_2O_2$ (30 mL of a 30 wt % aqueous solution), which slowly changed the color of the mixture from dark to light yellow over 20 minutes. The mixture was kept stirring for an additional 30 min before being subjected to purification.

In the purification process, the aqueous GO mixture was filtered over a PTFE membrane and the resulting cake was rinsed with aqueous HCl (2.5 L of a 1:9 v/v aqueous dilution of concentrated aqueous HCl) before being dried overnight in air. The as-prepared GO cake was then dispersed in acetone (1 L), with the dispersion being stirred for 15 min before being filtered over a PTFE membrane and rinsed with additional acetone (2 L). The collected GO filter cake was dried in air overnight and stored in ajar. When needed, a portion of this material was crushed and re-dispersed in DI water (enough to make a final dispersion of ~2 mg mL$^{-1}$ of GO) by hand shaking before being subjected to centrifugation at 129 g for 20 min (2×) to remove any of the unexfoliated GO (as precipitate).

Silicate. This material was synthesized by M.D. The "silicate", a Na-fluorohectorite with nominal composition $Na_{0.5}Mg_{2.5}Li_{0.5}Si_4O_{10}F_2$ was prepared by melt synthesis followed by annealing (6 weeks, 1045° C.) to improve charge homogeneity and phase purity. These steps were carried out in gas-tight molybdenum crucibles. Briefly, the educts were mixed according to the nominal composition. The crucible was ramped to 1750° C. (15° C. min$^{-1}$), held at this temperature for 70 min, cooled to 1300° C. (cooling rate 55° C. min$^{-1}$), and then cooled to 1050° C. (cooling rate 10° C. min$^{-1}$). Finally, it was quenched by switching off the power. The cation exchange capacity was determined to be 129 meq/100 g according to DIN ISO 11260 using $BaCl_2$ solution. The chemical composition was determined by microprobe analysis. As microprobe analysis is insensitive to Li, the Mg/Li-ratio was derived from ICP-OES analysis by assuming a complete occupancy of the tetrahedral positions (Si=4) and by normalizing stoichiometric coefficients of the cations to match the 22 negative charges of the anionic sublattice ($O_{10}F_2$). This way, a material with the $Na_{0.52(2)}Mg_{2.51(4)}Li_{0.46(2)}Si_4O_{10}F_2$ composition was obtained. The X-ray diffraction pattern recorded at 43% RH (data not shown) indicates a phase-pure Na-fluorohectorite with one layer of water molecules in the interlayer space ($d_{001}$=12.5 Å).

The as-synthesized Na-fluorohectorite was then added to deionized water to generate the single-sheet silicate dispersion used in the imaging studies. It is noted that Na-fluorohectorite, GO, and lepidocrocite-type titanates all belong to a handful of layered compounds that show the long-known but rare phenomenon of osmotic swelling. Osmotic swelling is a thermodynamically allowed repulsive process and allows for an utter and most gentle delamination simply by immersing the as-synthesized material into deionized water. No further purification is needed.

Titania. This material was synthesized using known procedures. The layered titanate of $K_{0.8}Ti_{1.73}Li_{0.27}O_4$ was synthesized via solid-state calcination of a stoichiometric mixture of $K_2CO_3$, $Li_2CO_3$, and $TiO_2$ at 900° C. for 20 h. The obtained polycrystalline sample was then heated in a flux melt of $K_2MoO_4$ at 1120° C. for 20 h to grow the platelet crystals, which were then isolated by sieving (5 g, 15~30 µm in size). The obtained crystals were then treated in HCl (500 mL of a 0.5 M aqueous solution) and the solution was agitated by a stirrer blade (180 rpm) for 3 days, with the treating solution being changed daily. The resulting protonated titanate ($H_{1.07}Ti_{1.73}O_4 \cdot H_2O$, ~4 g) was further soaked overnight with TBAOH (1 L of a 0.028 M aqueous solution). The resulting swollen crystals were isolated by centrifugation at 23188 g for 30 min and dispersed in DMSO (1 L). This mixture was gently and occasionally shaken by hand for 30 days to produce a colloidal suspension showing clear Schlieren texture. AFM observation of a dry thin film of this suspension on a silicon substrate showed titanate nanosheets ($Ti_{0.87}O_2^{0.56-}$) that were ~1 nm in thickness vs. several tens micron in lateral size.

Preparation of Nanosheet-Coated Samples

Substrate preparation. The substrates, including glass, Si, and ITO slides, were cleaned following the standard RCA treatment method to remove any organic surface residue. The substrates were: 1) immersed in a 1:1:5 v/v/v mixture of conc. $NH_4OH_{aq}/H_2O_2$ (30 wt % in water)/DI water at 75° C. for 20 min, 2) ultrasonicated in DI water for 30 min; and 3) rinsed with DI water. The gold substrates were prepared by depositing 30 nm of Au on the top of RCA-treated glasses by vacuum thermal evaporation in a NANO 38 evaporator (Kurt J. Lesker Co., Clairton, Penn., USA) at a rate of 1 Å s$^{-1}$.

Nanosheet Deposition

GO films were deposited by Langmuir-Blodgett technique. The as-prepared aqueous GO dispersion (~2 mg mL$^{-1}$) was diluted with MeOH to a 5:1 v/v mixture MeOH/$GO_{aq}$ dispersion. An aliquot (150-240 µL) of this GO dispersion was spread onto the water surface dropwise at a rate of 100 µL min$^{-1}$ using a glass syringe, forming a monolayer film on the surface. The film was allowed to equilibrate for at least 20 min after spreading, and then compressed by barriers at a rate of 30 cm$^2$ min$^{-1}$. The GO monolayer was then transferred onto the substrate at a surface pressure of 3 mN m$^{-1}$ by vertically dipping the substrate into the trough and slowly pulling it up at a rate of 2 mm min$^{-1}$. After the deposition, the nanosheet-coated substrates were annealed on a hot plate at 100° C. for 30 min in air to enhance adhesion of materials.

Titania films were also deposited by Langmuir-Blodgett technique. The colloidal suspension of surfactant-stabilized Ti$_{0.87}$O$_2^{0.56-}$ nanosheet (4 mg mL$^{-1}$) was diluted with DI water to a concentration of 8×10$^{-3}$ mg mL$^{-1}$ (~500×) and the resulting dispersion (~300 mL) was placed in the LB trough. After 20 min, the surface of the suspension was compressed at a rate of 30 cm$^2$ min$^{-1}$ until the surface pressure reached 3 mN m$^{-1}$ and then maintained at this constant pressure for 20 min. The film at the interface was then transferred onto the substrate using the vertical dipping method at a transfer rate of 2 mm min$^{-1}$. Annealing was carried out as described above for the GO films.

The as-prepared aqueous silicate dispersion (~10 mg mL$^{-1}$) was diluted with DI water to a 50:1 v/v mixture DI water/silicate$_{aq}$ dispersion. The silicate nanosheets were deposited onto the substrate by vertically dipping it into silicate dispersion (~0.2 mg mL$^{-1}$) and slowly pulling it up at a rate of 2 mm min$^{-1}$. Annealing was carried out as described above for the GO films.

To prepare heterostructures with specific stacking order, GO films were first deposited by Langmuir-Blodgett technique on substrates and annealed at 100° C. for 5 min. Silicate or titania films were deposited on GO-coated substrates by dip coating or Langmuir-Blodgett technique and then annealed at 100° C. for 30 min. The as-deposited samples (i.e., silicate-on-GO or titania-on-GO) thus had either silicate or titania nanosheets on top of GO. The deposit order was changed to switch the stacking order of the nanosheets and GO, producing either GO-on-silicate or GO-on-titania samples.

The heterostructures with random stacking order (i.e., ([silicate+GO] or [titania+GO]) were prepared by placing a droplet of the silicate solution and a droplet of GO solution together on the substrate, mixing them together with a plastic pipette tip, and annealing at 100° C. for 30 min.

Deposition of Fluorescent Dye-Polymer Films

To improve the uniformity of the dye coating onto the nanosheet-coated substrate, the dye was combined with a polymer matrix prior to spin coating. In a typical experiment, PM546 powder (2.5 mg) was dissolved in anisole (10 mL). Separately, PMMA (200 mg) was dissolved in anisole (10 mL). The PM546 and PMMA solutions were then mixed together in a 1:1 v/v ratio, resulting in a mixture with an overall concentration of 0.125 mg mL$^{-1}$ of PM546 and 10 mg mL$^{-1}$ of PMMA in anisole. To form a dye-polymer film atop of the nanosheet-coated samples, the substrate was placed upon the spin coater and an aliquot (100 μL for each 0.5 in$^2$ of substrate area) of the coating solution was dispensed on top of it. The assembly was then spun at 300 rpm for 5 s and then at 8000 rpm for 45 s To vary the thickness of the coating, solutions with 2, 5, 10, 20, and 50 mg mL$^{-1}$ of PMMA have also been used successfully. To measure the dye thickness on different substrates, the dye-polymer layer was scratched in a line with a blade, and the height of the edge was measured under AFM.

Results and Discussion

Figure 1A:
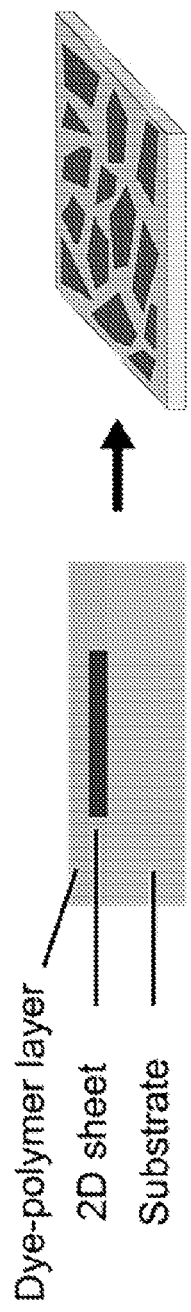
FIGS. 1A-1C.

FQM has been used for rapid, high-contrast optical imaging of graphene-based and transition-metal-dichalcogenide 2D sheets. As illustrated in FIG. 1A, FQM can be conveniently carried out in a lab setting by spin-coating a thin dye-polymer layer on these type of 2D sheets, which provides a bright background upon excitation against which the 2D sheets appear dark. FQM takes advantage of the ultralong energy-transfer distance between the fluorescent dyes and these strongly quenching 2D sheets to achieve high imaging contrast and high layer resolution for direct visual inspection using common fluorescence microscopes. However, FIG. 1A also shows that this approach is inappropriate for 2D sheets composed of other materials which do not (or do not significantly) quench the fluorescence from fluorescent dyes. Synthetic Na-fluorohectorite, a silicate clay with nominal composition Na$_{0.5}$Mg$_{2.5}$Li$_{0.5}$Si$_4$O$_{10}$F$_2$, is an example of such a 2D sheet.

A test sample was prepared by depositing both GO (as a control) and the silicate 2D sheets on the same glass microscope slide, which kept the FQM imaging conditions identical for the two types of sheets. The GO film was first deposited on half of the glass slide by Langmuir-Blodgett (LB) technique and was annealed at 80° C. to enhance its adhesion to the glass. Then the glass slide was rotated 180° for deposition of the silicate 2D sheets, which was also annealed prior to applying a PM546-PMMA dye-polymer layer by spin coating. Under illumination, the FQM image of the final test sample revealed distinct regions. The GO-deposited section on the right side of the glass slide comprised dark 2D sheets that clearly stand out against a bright background (FIG. 1B, right). However, the left side of the glass slide shows that the silicate 2D sheets appeared as nearly indistinguishable flakes against the bright glass background (FIG. 1B, left).

To acquire an optical microscopy image, one needs to first properly focus the microscope on the imaging plane to find the sample of interest. The silicate clay sheets are one-nanometer-thick, highly transparent, and do not quench fluorescence to any significant extent. As such, they cannot generate strong contrast under any optical imaging mode equipped with a typical fluorescence microscope. In practice, it is far from a routine task to image them with common optical microscopy techniques. In fact, to locate the silicate clay sheets on the sample shown in FIG. 1B, the area of clay sheets was intentionally overlapped slightly with the area of GO sheets (FIG. 1B, middle part). This enabled focusing the optical lens using the high-contrast GO sheets in the mixing area as a reference, and then moving the silicate clay area of the sample under the field of view to acquire the image. However, the contrast in the image of the silicate clay area was not sufficient to visualize or distinguish important details of individual silicate clay sheets.

Figure 1C:
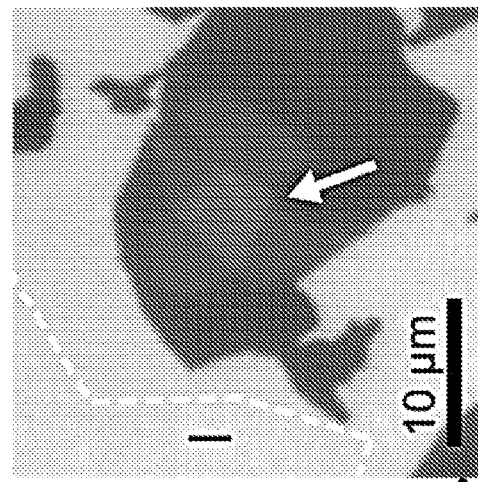
Figure 1B:
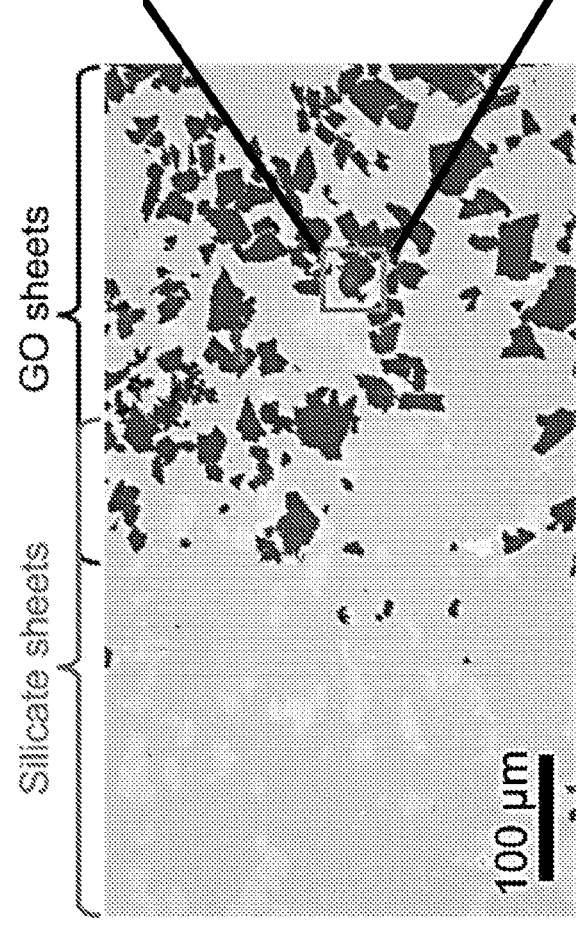

Magnifying the region between the GO- and the silicate-deposited areas (FIG. 1B, middle) by a factor of 10 further diminished the contrast between the silicate 2D sheets and the glass slide: the "stand-alone" silicate 2D sheets became effectively invisible on glass (FIG. 1C, region I, as marked by the white dashed line). However, it was observed that those on top of the GO were barely able to be discerned (FIG. 1C, the area indicated by the white arrow). The inventors realized that the silicate sheets on the GO sheet appeared lighter than the GO sheet itself because they acted as an "optically insulating" spacer between the dye-polymer overlayer and the strongly quenching GO sheet underneath. Notably, the double-layer region of two overlapping silicate sheets was brighter than the monolayer area due to an increase in the distance between the dye-polymer layer and GO, which in turn reduced quenching and enabled layer contrast.

Thus, the modification of the FQM technique described in the present disclosure is based, at least in part, on the inventors' realization derived from the serendipitous observation that 2D materials incapable of any significant quenching can, in fact, be imaged with high contrast if the 2D sheets are deposited on a strongly quenching substrate. Thus, the modification is related to the realization of the role that the substrate plays so that FQM can be extended to image a much broader variety of 2D materials than was previously understood. As illustrated in FIG. 2A, a strongly quenching substrate can serve as the dark background against the bright non-quenching or only weakly quenching sheets, thus providing a different, but still excellent contrast mechanism for imaging.

To demonstrate that the concept works, silicate 2D sheets were deposited on a broad range of strongly quenching substrates—such as ITO-coated glass, Si, and Au-coated glass, prior to covering them with PM546-PMMA layers of the same thickness. As shown in FIGS. 2B-2D, the images of the samples clearly show that the 2D sheets can be vividly distinguished against the background of the substrate with high layer resolution (i.e., overlaps, wrinkles, and folds can be distinguished) for all of the strongly quenching substrates. The contrast of the images for each substrate can be further optimized by tuning the exposure time (FIGS. 8A-8C). AFM images showed that the contrast may also be optimized by tuning the thickness of the dye-polymer overlayer. In particular, AFM images of ITO and Si substrates coated with dye-polymer overlayers of different thicknesses were obtained. The thickness of the dye-polymer overlayer was tuned by changing the concentration of the PMMA carrier in the coating solution (using 2 mg/mL; 5 mg/mL; 10 mg/mL; 20 mg/mL; and 50 mg/mL). (See also FIGS. 9A-9J.)

To compare the modified FQM technique directly against other imaging methods, a sample of silicate 2D sheets was deposited on a piece of Si wafer by dip-coating. Imaging showed that the sheets were not visible under the reflectance mode of the optical microscope. AFM imaging confirmed that the silicate 2D sheets were indeed single layers of around 1.1 nm in thickness (the van der Waals thickness of one silicate layer is 0.96 nm), with overlapped areas of ~2.3 nm in height (FIG. 3A). The same sample was then spin-coated with a thin PM546-PMMA overlayer for imaging according to the modified FQM technique. The as-acquired image (FIG. 3B) showed distinct contrast between the substrate and the deposited 2D sheets, rivaling that obtained with SEM (FIG. 3C). Notably, there is a clear contrast between overlapping silicate 2D sheets (the boxed area of FIG. 3B) that perfectly matched the AFM view (FIG. 3A), allowing single and double layers to be distinguished. These results show that FQM is an optical technique that can be carried out on a broad variety of 2D sheets under ambient laboratory conditions with clear advantages over AFM (small areas and time-consuming image acquisition, requiring atomically smooth substrates) and SEM (vacuum acquisition, requiring conductive substrates). Moreover, FQM offers a high-contrast method for facile analysis of samples over large areas, which can be quite useful in the development of new material and coatings during synthesis and process optimization.

Figure 4A:
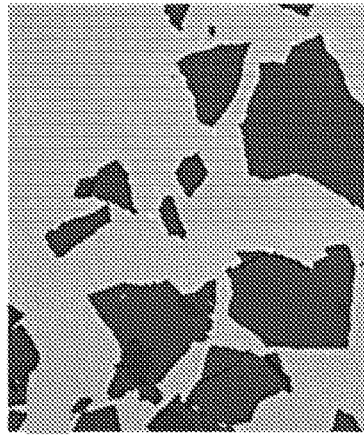
FIGS. 4A-4F. FQM images of (FIG. 4A) GO, (FIG. 4B) titania, and (FIG. 4C) silicate sheets deposited on ITO substrates. Scale bars=50 µm.
Figure 4B:
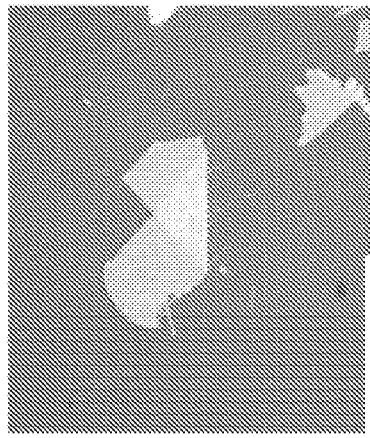
Figure 4C:
Figure 4D:
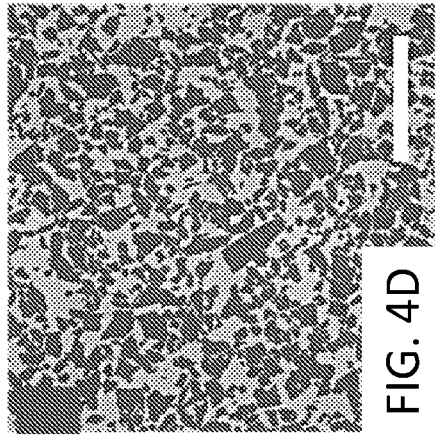
Figure 4E:
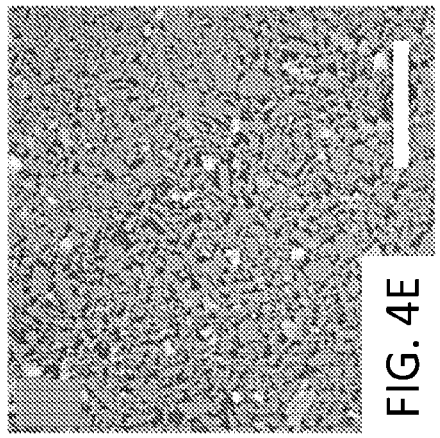
Figure 4F:
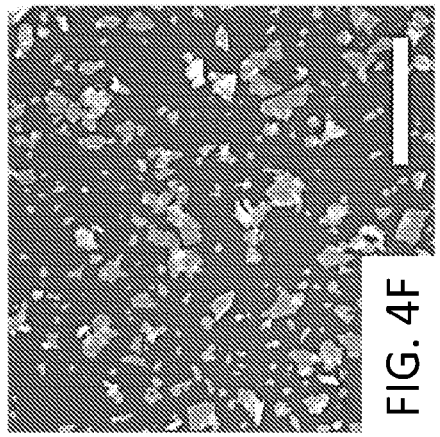

The use of strongly quenching substrates for FQM imaging can be extended to other 2D materials such as single-layer titania ($Ti_{0.87}O_2$) sheets, while still also being used with graphene-based sheets. AFM images of GO and titania samples deposited by LB on silicon substrates showed that these materials are single layer in nature. FIGS. 4A-4F show FQM images of GO and titania and silicate sheets deposited on the ITO substrates using a less-than-10 nm PM546-PMMA fluorescent overlayer, all of which can be readily discerned against the background but via different contrast mechanisms. GO can quench the dye better than the ITO substrate and thus appeared as darker sheets against the background (FIG. 4A). In contrast, titania, as a weaker quencher than ITO, appeared in FQM as off-white sheets against the dark ITO background, quite similar to silicate sheets (cf. FIGS. 4B and 4C). Notably, all the FQM images showed high contrast and good layer resolution. Therefore, using strongly quenching substrates such as those tested here greatly expands the scope of FQM, making it a general imaging technique for visualizing a large range of 2D materials. Being an optical microscopy technique, FQM can readily scan through relatively larger sample areas, making it particularly useful for quick evaluation of the size distribution of the sheets, uniformity of the sheet thickness, and surface coverage of the sheets (see FIGS. 4D-4F).

The serendipitous observation made from FIG. 1C was further exploited by the inventors to make use of FQM to characterize 2D heterostructures and distinguish their vertical stacking sequence. To this end, silicate-on-GO (denoted as type-I stack, FIG. 5A) and GO-on-silicate (denoted as type-II stack, FIG. 5C) heterostructures were prepared on ITO substrates using layer-by-layer dip coating. This created calibration samples with known stack sequence for FQM imaging. Next, co-deposition of both 2D materials by drop casting resulted in a testing sample with GO-silicate heterostructures with mixed types of stacking sequence (FIG. 5E). As shown in the corresponding FQM images (FIGS. 5B-5F), GO and silicate sheets can be easily differentiated based on their different quenching abilities relative to that of the substrate. In addition, the vertical topology of the heterostructures can readily be distinguished via contrast differences of the overlap areas: when the strongly quenching GO sheet was beneath the silicate, its dye-quenching ability diminished and the overlap area appeared lighter than the GO area (FIG. 5B, see area denoted as type I). However, when the GO layer was on top of the silicate 2D sheets, there was no intensity difference between the overlap and GO regions (FIG. 5D, see area denoted as type II) because the GO quenched most of the dye fluorescence in the relatively thin (~12 nm) dye-polymer overlayer. Thus, the two different types of overlap areas in the randomly stacking sample can readily be identified (FIG. 5F, see areas denoted as type I or II). The stacking order for titania and GO heterostructures can also be differentiated under similar conditions (FIGS. 11A-11F). These results underlined the versatility of FQM (modified by the use of strongly quenching substrates) for the rapid characterization of various types of 2D sheets, mixed 2D sheets, and their vertical architectures.

Conclusion

In conclusion, by using strongly quenching substrates such as metals or ITO-coated glass and doped silicon wafers, the scope and capability of FQM can be greatly expanded, increasing its utility as a versatile technique for imaging a broad range of 2D materials. By depositing 2D silicate clay, titania, and GO sheets on strongly quenching substrates along with a dye-polymer coating, it has been shown that these 2D materials can be readily imaged by FQM with contrast and layer resolution comparable to conventional SEM and AFM, but with more facile sample preparation and much higher throughputs. Notably, these results show that FQM can be applied to characterize mixtures and vertical heterostructures comprising more than one type of these 2D sheets. As a highly attractive imaging technique, it can potentially replace SEM and AFM for routine, quick sample evaluation of various micron-sized 2D sheets, enabling rapid, high-throughput analyses that aid in the research and development of these 2D materials.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the invention to enable one skilled in the art to utilize the disclosure in various embodiments and with various modifications as suited to the particular use contemplated. It is intended that the scope of the disclosure be defined by the claims appended hereto and their equivalents.

What is claimed is:

1. A method of imaging a 2D sheet, the method comprising:
   (a) illuminating a sample with light having a wavelength X, the sample comprising
      a quenching substrate;
      a transparent, non-quenching 2D sheet on the quenching substrate; and
      a fluorescent layer comprising fluorescent dye molecules on the transparent, non-quenching 2D sheet and the quenching substrate, providing background domains and 2D sheet domains in the sample, wherein the light induces fluorescence of the dye molecules in the fluorescent layer; and
   (b) detecting fluorescence from the sample to provide an image of the transparent, non-quenching 2D sheet, wherein an intensity $I_B$ of the detected fluorescence from the background domains is less than an intensity $I_{2DS}$ of the detected fluorescence from the 2D sheet domains, thereby providing contrast in the image.

2. The method of claim 1, wherein the contrast is $(I_{2DS}-I_B)/I_{2DS}$ and is greater than 50%.

3. The method of claim 1, wherein a mixture of the transparent, non-quenching 2D sheet and a reference dye molecule has a peak fluorescence intensity within 10% that of the fluorescent dye molecule alone.

4. The method of claim 3, wherein the reference dye molecule is fluorescein.

5. The method of claim 3, wherein the reference dye molecule is one of the fluorescent dye molecules.

6. The method of claim 1, wherein the transparent, non-quenching 2D sheet is selected from the group consisting of boron nitride, a clay, a metal oxide, and combinations thereof.

7. The method of claim 6, wherein the clay is hectorite and the metal oxide is $TiO_2$.

8. The method of claim 1, wherein the transparent, non-quenching 2D sheets comprise at least two different types of transparent, non-quenching 2D sheets.

9. The method of claim 1, the sample further comprising a transparent, quenching 2D sheet on the quenching substrate.

10. The method of claim 9, wherein the transparent, quenching 2D sheet is selected from the group consisting of a graphene-based sheet, a metal dichalcogenide sheet, and combinations thereof.

11. The method of claim 1, wherein a layer of a reference dye molecule on the quenching substrate has a peak photoluminescence intensity of no more than 50% that of the layer on uncoated glass.

12. The method of claim 11, wherein the reference dye molecule is fluorescein.

13. The method of claim 11, wherein the reference dye molecule is one of the fluorescent dye molecules.

14. The method of claim 1, wherein the quenching substrate is selected from doped silicon, a metal, metal-coated glass, or indium tin oxide (ITO)-coated glass.

15. The method of claim 1, wherein the fluorescent layer further comprises a polymer.

16. The method of claim 1, wherein the fluorescent layer has a thickness in a range of from 5 nm to 20 nm.

17. The method of claim 1, wherein the transparent, non-quenching 2D sheet is in a stack comprising a transparent 2D sheet having a different quenching ability as compared to the transparent, non-quenching 2D sheet, the method further comprising determining a stacking order of the transparent, non-quenching 2D sheet and the transparent 2D sheet having the different quenching ability.

* * * * *